March 6, 1928. 1,661,313
W. E. STEVENS ET AL
AUTOMOBILE TROUBLE LAMP
Filed Jan. 29, 1927  2 Sheets-Sheet 1
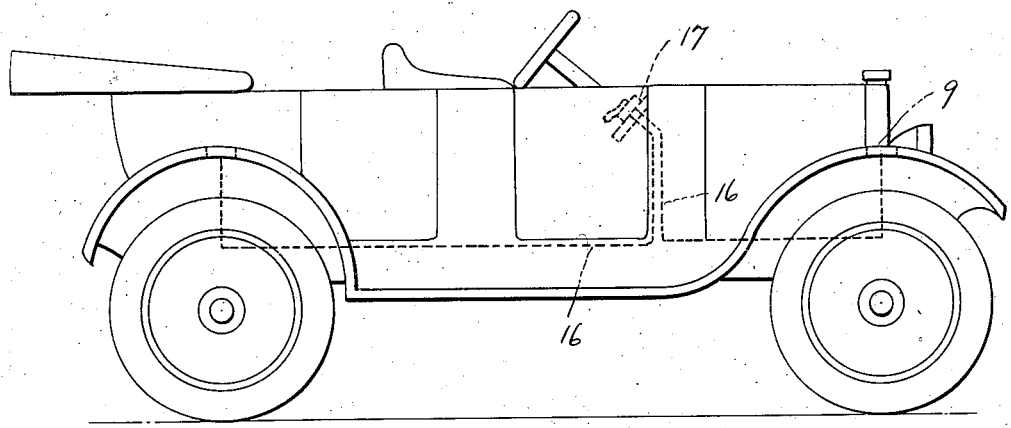
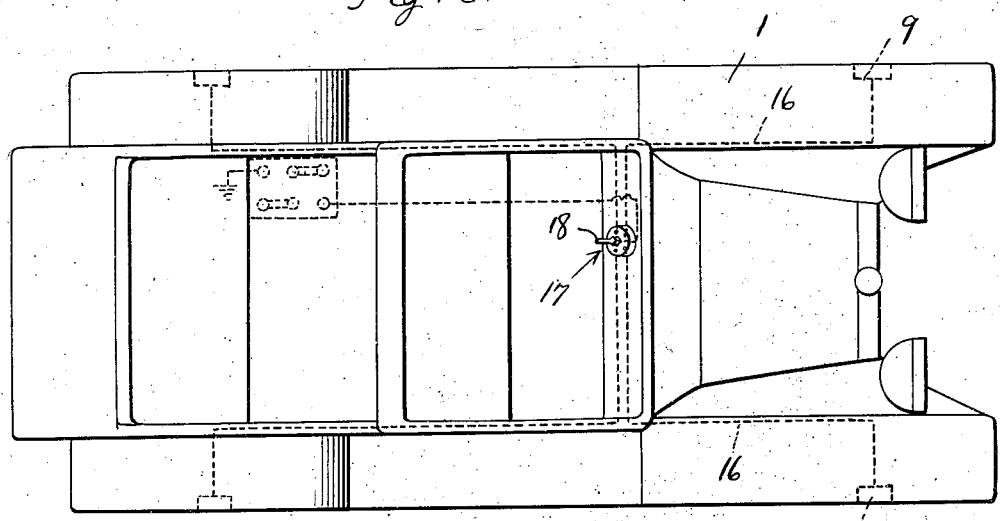
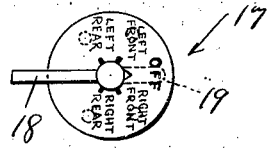
Inventors
Walter E. Stevens
Torrence R. Seiple
By Clarence A. O'Brien
Attorney

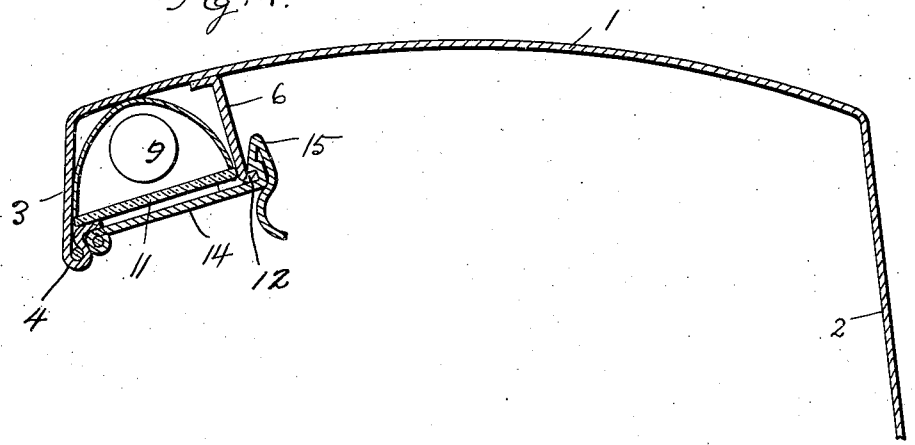
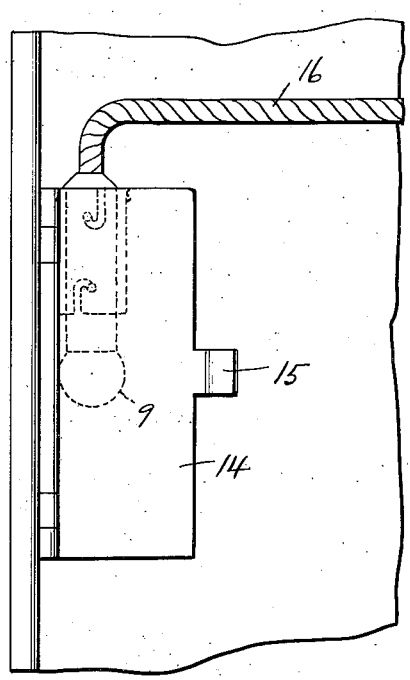
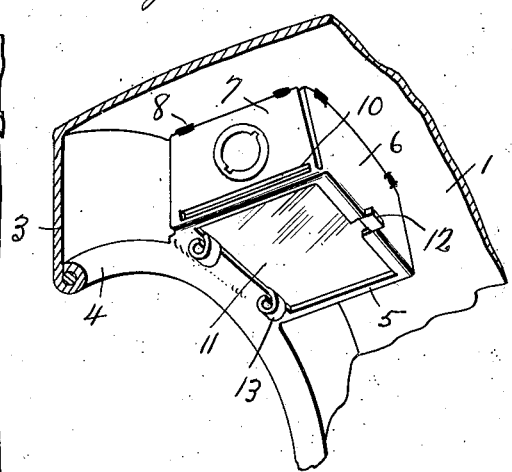

Patented Mar. 6, 1928.

1,661,313

UNITED STATES PATENT OFFICE.

WALTER E. STEVENS AND TORRENCE R. SEIPLE, OF ASHLEY, PENNSYLVANIA.

AUTOMOBILE TROUBLE LAMP.

Application filed January 29, 1927. Serial No. 164,598.

This invention relates to an improved lighting arrangement for automobiles, and it has more particular reference to a trouble lamp structure including individual lamps for the automobile wheels, the lights being carried by the fenders, and located to project light rays onto the wheels to aid in the replacement and removal of tires.

The invention has more particular reference to a lighting arrangement of this character wherein a separate source of illumination is provided on the under side of each fender, in a position for cooperation with an adjacent wheel, whereby to facilitate repairs, these illuminators being controlled from an appropriately constructed and arranged control switch located preferably on the instrument board.

The particular features and advantages will become apparent from the following description and drawings.

In the accompanying drawings forming a part of this application, and in which like numerals are employed to designate like parts throughout the same:—

Figure 1 is a side elevation of an ordinary automobile showing the general arrangement of the lamps.

Fig. 2 is a top plan view of the same showing the diagrammatic lay-out.

Fig. 3 is a detail view of the control switch.

Fig. 4 is an enlarged transverse section through one of the fenders showing the construction and arrangement of one of the lights or lamps.

Fig. 5 is a bottom plan view of the same.

Fig. 6 is a fragmentary detail perspective view.

In the drawings we have shown four lights, one for each wheel fender. Here, we might say that the lights may be in the form of attachments, or may be built in in the fenders. In any instance, however, there will be a separate light for each wheel located in a manner to cause the rays of light to be projected in an efficient way onto the tire and wheel and hub structure to facilitate repair and replacement and removal of tires, etc.

In the arrangement in the drawings, we have shown the lights as built into the fenders, but as stated, they may be made separate and put on existing parts of cars. Inasmuch as each light construction is the same, a description of one will suffice for all. To this end and by directing attention to Figs. 4, 5 and 6, it will be seen that the reference character 1 designates an automobile fender having an inclined shield 2 on one longitudinal edge, and a depending flange 3 on the opposite and outer edge.

Under ordinary circumstances, the lower edge of the flange 3 is rolled to provide a reinforcing bead 4, (see Figs. 4 and 6 in particular). Inasmuch as the light is built into the fender, in this showing, we would state that this is accomplished by providing the fender forming material with an extension of size, shape and proportion to allow it to be bent into box-like form. For instance, there is a horizontal portion 5 constructed to form a frame, and bent up from one longitudinal side and the two ends is a side wall 6 and duplicate end walls 7. These are welded as at 8 to the underside of the fender, thus forming a housing for the light bulb 9.

The bulb is preferably removably mounted in any appropriate way. For instance, one end wall may be provided with an opening through which a bulb mounting may be extended. At this time, we would direct attention to a slot 10 which is formed in one end of the housing to allow a glass plate or lens 11 to be inserted therethrough for closing the frame 5. We would also direct attention to an outwardly extending keeper tongue 12 and curled knuckles 13, (see Fig. 6).

At this time, attention is directed to a supplemental cover 14 (see Fig. 4 especially) which is hingedly mounted upon the knuckles 13 by suitable hinge pintle. This cover swings over the glass lens subject to prevent accumulation of mud and dirt thereon. This cover is provided with a resilient latch 15 to snap over the keeper forming tongue 12.

Manifestly when the latch 15 is disengaged from the keeper tongue 12, the cover 14 will be free to assume and remain in a pendent position for the illumination of a wheel under the fender.

It is yet to be pointed out that a current supply wire 16 leads to each light and is enclosed in suitable insulation suspended from portions of the car and assuming the position indicated somewhat in the dotted line diagram represented in Fig. 2. The various wires lead to a central control switch 17 having an operating handle 18 for actuating a contact arm 19 which may be selectively engaged with any one of the binding posts leading to any one of the lights. In this way, the operator can turn on the desired light, can open the supplemental closure, and allow the light rays to be projected onto the wheel to aid in removing the tire, replacing it, or making any other repairs desired.

Obviously, the convenience and efficiency of an arrangement of this kind will be quite clear to those skilled in the art to which the invention relates. In view of this, a more lengthy description is thought unnecessary.

Minor changes in the shape, size, and relation of the parts may be resorted to within the field of the invention as claimed.

Having thus described our invention, what we claim as new is;—

In combination, a wheel fender, a lamp housing body carried at the under side of said fender and open at its lower side, and having a keeper at one end of its lower side and also having a lens at said side arranged to direct light downwardly and toward a wheel complementary to the fender, a lamp in said housing above said lens, and a cover of imperforate character hingedly connected to the housing body at one end of said lower side of the housing body and having a latch at its opposite end adapted to engage said keeper tongue of the housing body; said cover when its latch is disengaged from the keeper tongue being adapted to gravitate to and remain of itself in a pendent position at one end of said lens and at a substantial right angle thereto.

In testimony whereof we affix our signatures.

WALTER E. STEVENS.
TORRENCE R. SEIPLE.